United States Patent [19]
Cutler et al.

[11] 3,733,511
[45] May 15, 1973

[54] MOLECULAR BEAM TUBE HAVING MEANS FOR DEGAUSSING THE MAGNETIC SHIELDING STRUCTURE

[75] Inventors: Leonard S. Cutler, Los Altos Hills; Joseph H. Holloway, Saratoga, both of Calif.

[73] Assignee: Hewlett-Packard Company, Palo Alto, Calif.

[22] Filed: Apr. 26, 1971

[21] Appl. No.: 137,455

[52] U.S. Cl. .............................315/8, 315/5, 331/3, 331/94, 250/41.3
[51] Int. Cl............................G01n 27/28, H01s 1/00
[58] Field of Search .....................250/41.3; 315/8, 315/4, 111, 5; 317/157.5; 331/94, 3; 324/.5

[56] References Cited

UNITED STATES PATENTS

| | | | |
|---|---|---|---|
| 3,345,581 | 10/1967 | Vessot | 331/94 |
| 3,317,781 | 5/1967 | Barbin et al. | 315/8 |
| 3,462,705 | 8/1969 | Vessot | 331/94 |
| 3,323,009 | 5/1967 | Holloway | 315/4 X |
| 3,412,259 | 11/1968 | Schept | 317/157.5 |

*Primary Examiner*—Rudolph V. Rolinec
*Assistant Examiner*—Marvin Nussbaum
*Attorney*—Stephen P. Fox

[57] ABSTRACT

The polarizing magnetic field structure of a molecular beam tube is degaussed during operation of the tube by a circuit including a solenoid coil coupled to a very low frequency, square wave, exponentially-decaying, current source.

9 Claims, 4 Drawing Figures

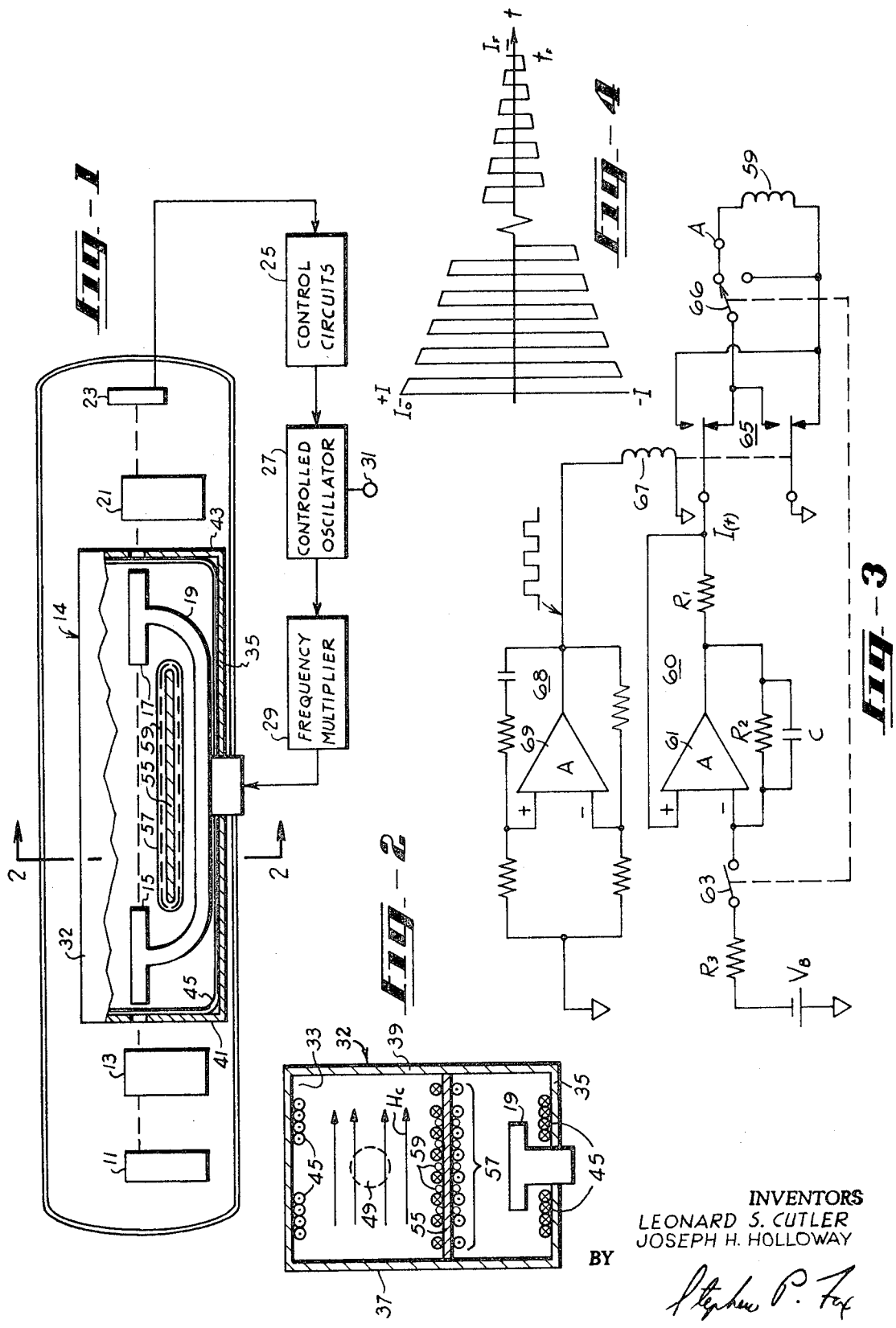

MOLECULAR BEAM TUBE HAVING MEANS FOR DEGAUSSING THE MAGNETIC SHIELDING STRUCTURE

BACKGROUND OF THE INVENTION

The present invention relates in general to molecular resonance devices such as a beam tube of the type disclosed, for example, in U. S. Pat. No. 3,323,008, issued to Joseph H. Holloway et al. on May 30, 1967, and assigned to the same assignee as the present invention.

A typical beam tube comprises a source of molecular or atomic particles, and a first deflecting or state selecting magnet, commonly referred to as the A magnet, which selects from the source only those particles having certain energy states. The atomic particles are formed into at least one beam and transmitted into a radio frequency (r.f.) transition section of the tube, wherein the atomic particles undergo magnetic hyperfine resonance transitions, i.e., transitions from one energy state to another. This is accomplished by applying r.f. energy to the atomic particles at the transition frequency of the particles in the presence of a polarizing magnetic field. The polarizing magnetic field, commonly referred to as the C-field, has a predetermined orientation relative to the r.f. field, and a low value relative to the magnitude of the magnetic field produced by the A magnet. The atomic particles pass from the r.f. transition section of the tube to a second deflecting or state selecting magnet which is known at the B magnet, and is similar in configuration and operation to the A magnet. The B magnet functions to direct onto a suitable detector those atomic particles which have undergone r.f. transitions. The atomic particles which do not undergo resonance transitions are directed away from the detector. Thus, by monitoring the output of the detector, it can be determined whether or not magnetic resonance has occurred.

The resonant r.f. frequency of the beam tube is dependent on the magnitude of the polarizing magnetic C-field, which is typically produced by a C-field magnet configuration including a solenoid coil disposed adjacent to the beam. In order to insure optimum operation of the beam tube and to maintain the accuracy of the beam tube when used as a frequency or time standard, for example, the C-field must be precisely set and controlled. Undesirable changes in the magnetic fields in the C-field magnet structure should be eliminated. Such changes are often produced by thermal cycling, external magnetic field variations, or pounding, bouncing or other sudden acceleration forces which occur during manufacture and shipment of the beam tube. In addition, when it is desired to shift the operating frequency of the beam tube by slightly changing the magnitude of the C-field, such frequency shifts often require a substantial time period, typically on the order of several days, because of slow relaxation of residual magnetism in the C-field structure. These adverse affects of stray and residual magnetic fields can be eliminated by degaussing the C-field structure. However, the heretofore known typical degaussing technique has been to manually apply an a.c. magnetic field at line frequency (60 hertz) to the beam tube from positions both internal and external to the tube envelope. Such a technique has been found unsatisfactory in achieving the desired degaussing objectives primarily because of the lack of penetration of the degaussing field into the material of the C-field structure due to the small skin depth at 60 hertz.

SUMMARY OF THE INVENTION

The present invention relates to means for degaussing the polarizing magnetic C-field or shielding structure in a molecular resonance tube. The degaussing means in the illustrated embodiment includes a coil disposed around a baffle plate in the magnetic shielding region, and a current source for driving the coil with an alternating, exponentially-decaying current at a very low frequency. The current source includes generator means for producing an exponentially-decaying current, a square wave oscillator, and switch means for applying current from the generator means to the coil and for reversing the polarity thereof in synchronism with the frequency of the square wave oscillator.

BRIEF DESCRIPTION OF THE DRAWINGS

FIG. 1 is a diagrammatic illustration of an atomic beam tube including a cutaway view along the longitudinal midline of the r.f. transition section of the beam tube.

FIG. 2 is an enlarged cross-sectional view taken along the line 2—2 of FIG. 1.

FIG. 3 is a combined schematic and block diagram of the current source of the degaussing means of the present invention.

FIG. 4 is a graph illustrating the current waveform of a selected point in the circuit of FIG. 3.

DESCRIPTION OF THE PREFERRED EMBODIMENT

Referring to FIG. 1, an atomic beam tube includes an oven source 11 containing a liquid cesium, for example. The cesium is evaporated and diffuses out of the source 11 in the form of a beam, which is directed through a first state selecting magnet structure (the A-field magnet) 13. Cesium atoms exist naturally in two different energy states, and the state selecting magnet structure 13 operates to deflect atoms of one energy state out of the beam path while directing atoms of the other desired energy state along the beam path. Atoms of the desired energy state are then directed through an r.f. transition section 14 including two waveguide sections 15, 17 which are fed from another waveguide 19. The waveguide 19 is driven at its mid-point from a source of microwave energy, as hereinafter described. If the microwave energy is at the proper frequency, the atoms subjected thereto along the beam path are caused to change energy states. The atoms then pass through a second state selecting magnet structure 21 which is configured substantially the same as the first state selecting magnet 13 and operates to deflect out of the beam path all atoms except those which have undergone a transition in energy state. The atoms having the desired energy state impinge on a detector 23. This detector produces an output signal which is fed to control circuitry 25 which in turn produces an error signal for controlling a crystal oscillator 27. The output of the oscillator 27 is multiplied by a frequency multiplier 29, which provides microwave energy to the waveguide 19 at the resonance frequency of the atoms travelling through the r.f. section.

As indicated above, if the frequency of the microwave energy equals the resonance frequency of the atoms, the atoms change energy states and are subsequently directed to the detector 23. Therefore the presence of an atom current output from the detector 23 indicates that the signal frequency injected into the waveguide 19 by the frequency multiplier 29 is equal to the resonance frequency of the atoms. The circuits 25, 27, 29 operate in a servo loop with the beam tube to maintain the microwave energy at the resonance frequency of the atoms. A precisely controlled output signal obtained from the controlled crystal oscillator 27 at an output terminal 31 may be applied to suitable external utilization circuitry.

In order for the atoms to change energy states, they must be properly polarized in the r.f. transition section 14. Referring to FIGS. 1 and 2, polarization is achieved by magnetic C-field producing means which includes an elongated tubular structure 32 surrounding the atomic beam and made of a magnetic permeable material. The tubular structure 32 has a rectangular cross section and is formed of two opposite side walls 33, 35 and two other opposite side walls 37, 39. The ends of the tubular structure 32 are closed by end plates 41, 43 which are also made of magnetic permeable material. The end plates 41, 43 are apertured to permit the atomic beam to pass therethrough. Thus, the waveguide structures 15, 17, 19 are enclosed in a box formed by the tubular structure 32 and the end plates 41, 43.

Disposed on the side walls 33, 35 is a first means 45 for conducting current longitudinally of the beam axis to produce a polarizing magnetic C-field transversely to the direction of the beam. In the illustrated embodiment of the invention, the current conducting means 45 includes two groups of insulated wires which are disposed parallel to one another and to the axis of the atomic beam on the interior surfaces of the side walls 33, 35, as disclosed in more detail in a copending patent application Ser. No. 837,398 filed June 30, 1969, in the name of Richard F. Lacey and assigned to the same assignee as the present invention. As shown in FIG. 2, current is conducted in both groups of wires in a direction perpendicular to the plane of the paper, as indicated by the dots and cross-marks in each wire according to common convention. This current flow produces a magnetic C-field, as indicated by the field lines $H_c$, for suitably polarizing the atoms of the beam as they pass through the r.f. transition section. The atomic beam travels perpendicularly to the plane of the paper in the region indicated generally by the dashed circular outline 49.

In order to minimize the magnetic field effects of the hole in wall 35 of the tubular structure 32 where r.f. energy is introduced into waveguide 19 from frequency multiplier 29, a baffle plate 55 of magnetic permeable material is positioned between the side walls 37, 39 and parallel to the side wall 35 in the region between the waveguide sections 15, 17. This baffle plate shields the atomic beam from the hole in wall 35. The baffle plate 55 has a solenoid coil 57 evenly wound thereon, as shown. The coil 57 is coupled to a source of power, not shown, so that current conducted by its upper windings is in a direction equal and opposite to that conducted by the C-field solenoid coil 45. This may easily be achieved by arranging the two coils 45, 57 with the same number of ampere turns.

Another coil 59 may also be disposed on baffle plate 55 for the purpose of degaussing the elongated magnetic C-field structure 32. As shown, the degaussing solenoid coil is wound between the turns of solenoid coil 57. A degaussing current is applied to solenoid coil 59 as hereinafter described. Preferably the solenoid coil 59 is electrically isolated from the C-field coil 45 and the coil 57 on baffle plate 55, as shown, so that the degaussing current may be applied to degauss the C-field structure without disturbing the polarizing magnetic field produced thereby. However, alternatively, the coil 59 may be electrically coupled to the coil 57 so that it is part of the magnetic C-field producing circuit.

FIG. 3 illustrates one type of circuit for providing the degaussing current to solenoid coil 59. A current generator 60 includes a differential operational amplifier 61 which produces a current $I(t)$ that begins decaying exponentially from a predetermined value during a time interval which begins when a normally closed switch 63 is opened. The decaying current $I(t)$ is given by the following equation:

$$I(t) = V_B R_2/R_1R_3 \; e^{-t/R_2C}$$

where $V_B$, $R_1$, $R_2$, $R_3$ and $C$ are the values of the corresponding components in FIG. 3. The current $I(t)$ is applied through one contact of a double-pole, double-throw relay 65 and thence through a single-pole, double-throw switch 66 to the degaussing coil 59. Switches 63 and 66 are operated together as shown by the dashed line connecting them. When switch 63 is closed, switch 66 is positioned with its wiper arm downward, thereby to ground the output of current generator 60 and leave coil 59 open. Slightly before switch 63 is opened, the wiper arm of switch 66 is moved upward to couple coil 59 to the output of generator 60.

The contacts of relay 65 are arranged in a polarity reversing configuration so that the current flow $I(t)$ is reversed in degaussing coil 59 each time the relay contacts are moved from one position to the other. The contacts of relay 65 are mechanically operated by the relay coil 67, which in turn is driven by a square wave oscillator 68 including a differential operational amplifier 69. Thus the polarity of the exponentially-decaying degaussing current through coil 59 is reversed in synchronism with the pulses from the square wave oscillator.

FIG. 4 illustrates the waveform of the degaussing current at point A in FIG. 3. In the steady state condition, switch 63 is normally closed and the current $I(t)$ has a value $I_o = V_B R_2/R_1R_3$. When switch 63 is opened, the current at point A begins alternating polarity while decaying exponentially to a value $I_f$ after a time period $t_f$. In one embodiment of the beam tube, satisfactory initial degaussing has been achieved with an initial current $I_o$ selected to provide about two ampere turns through solenoid coil 59, and with a time constant $R_2C$ of 100 seconds, so that the degaussing field decays exponentially to a value $I_f$ which provides a magnetizing force of $2.5 \times 10^{-5}$ ampere turns after a time period $t_f$ of about 11 time constants, i.e., about 18 minutes.

The frequency at which the degaussing current alternates should be low enough to permit the degaussing field to thoroughly penetrate the elongated C-field structure 32. The depth of penetration for given a.c. frequencies of the degaussing field varies inversely as the square root of the product of the a.c. frequency and the permeability of the material from which structure 32 is constructed. Since high permeability materials are used, the field penetration depth will be small. For example, if the material is molybdenum permalloy having a relative permeability of $10^5$, the penetration depth will be about 0.006 inch at 60 hertz. This is insufficient to degauss the C-field structure with practical currents (i.e., currents less than about 10 amperes) in the typical case where the walls of the structure are on the order of 0.050 inch thick. It has been found that satisfactory degaussing of the C-field structure is achieved when the degaussing field is reversed at a very low frequency on the order of 0.5 hertz. The oscillator 68 produces square wave pulses at this frequency, and each pulse is one-half cycle in duration.

Preferably, initial degaussing of the structure 32 is performed by passing the current $I(t)$ through coil 59 at the same time that the operational C-field excitation current is flowing through coils 45, 57. If this is not done, i.e., if degaussing is performed in the absence of C-field excitation current or in the presence of an excitation current different from that used after degaussing, then the structure 32 will be left in a magnetic state different from its final relaxed state. As a result, the magnetic material which forms structure 32 will slowly relax or drift towards the desired final magnetic state, which in turn causes the magnetic C-field to drift with time and slowly change the operating frequency of the beam tube. Such results are obviously undesirable where precision operating frequencies are required.

In addition, the presence of the closed magnetic path in the permeable material around the coil 59 provides a low reluctance to the magnetic flux. Thus only a small current is required in solenoid coil 59 to saturate the structure 32 during the degaussing process.

Once initial degaussing is completed, the beam tube structure 32 may be subjected to lower current level degaussing while the beam tube is operating as a clock or frequency standard. For the case where the structure and parameters during initial degaussing are as described above, the low level degaussing preferably starts at about 0.05 ampere turns. This level is sufficient to degauss the structure for small, deliberate C-field changes while not appreciably disturbing the operation of the frequency standard.

It is possible to apply a very low level, constant peak magnitude, alternating degaussing field to the structure on a continuous basis while the tube is in operation as a clock or frequency standard. For the structure described above this magnetizing force could be about $10^{-5}$ ampere turns.

In summary, the degaussing system described herein permits complete degaussing of the beam tube to a desired operating point using only a low level degaussing current and with minimum interruption of beam tube operation.

We claim:

1. In a molecular beam tube apparatus including source means for projecting molecular particles, a first state selector for forming said projected particles into at least one molecular beam, an r.f. transition section disposed downstream from said first state selector for effecting resonance of the beam particles, means for producing a polarizing magnet field in the r.f. transition section, a second state selector disposed downstream from said r.f. transition section for deflecting selected molecular particles in the beam, and a detector for receiving molecular particles from said second state selector to indicate when molecular resonance occurs in said r.f. transition section; the improvement wherein said means for producing a polarizing field comprises:

an elongated structure constructed of magnetically permeable material and having a longitudinal axis aligned with the path of said molecular beam, said structure being configured to at least partially surround said beam in said r.f. transition section;

conducting means for conducting a first current within said elongated structure to produce a homogenous magnetic polarizing field in the path of said molecular beam, and conducting a second current for degaussing said elongated structure;

source means coupled to said conducting means for providing said second current, said source means including:

current generator means for providing an output current which decays with a predetermined time constant;

oscillator means for providing an output signal at a predetermined low frequency; and polarity reversing means responsive to said oscillator means for coupling the output of said current generator means to said conducting means, and reversing the polarity of the output current from said current generator means in synchronism with the output signal from said oscillator means.

2. The apparatus of claim 1 wherein:

said conducting means comprises first means for conducting said first current and second means for conducting said second current;

said current generator provides an output current which decays exponentially;

said oscillator means provides an output signal which is a square wave; and said polarity reversing means includes switch means having control input means coupled to the output of said oscillator means for reversing the polarity of said exponentially-decaying current output from said current generator in synchronism with said square wave signal.

3. The apparatus of claim 2 wherein said predetermined time constant is on the order of 100 seconds, and said predetermined frequency is on the order of 0.5 hertz.

4. The apparatus of claim 2, wherein said current generator means provides an output current having a predetermined low value sufficient to continuously degauss said elongated structure without significantly perturbing the operation of the tube as a frequency standard.

5. The apparatus of claim 2, wherein said current generator means and said oscillator means each includes a differential input, operational amplifier.

6. The apparatus of claim 2, wherein said polarity reversing switch means includes a relay having double-pole, double-throw switch contacts, and wherein said control input means of said switch means is a solenoid coil for operating said switch contacts.

7. The apparatus of claim 2, wherein said second means for conducting current is a coil disposed adjacent to said elongated structure, said coil being operable to conduct current longitudinally of said elongated structure.

8. The apparatus of claim 7 wherein said r.f. transition section includes a waveguide structure having two sections spaced apart along the molecular beam path for applying microwave energy to the beam, and wherein said elongated structure surrounds said waveguide structure and has an aperture in one side wall thereof for coupling microwave energy from an external source to said waveguide structure, and further including baffling means disposed adjacent to and longitudinally of the molecular beam and intermediate the two sections of said wave-guide structure for shielding the molecular beam from the magnetic field effects of the aperture in said side wall, said second means for conducting current longitudinally of said elongated structure being disposed on said baffling means.

9. In a molecular resonance apparatus including a molecular interaction region for effecting resonance of molecules by electromagnetic field excitation, and means for magnetically shielding said molecular interaction region, an apparatus for degaussing said magnetic shielding means comprising:

current conducting means disposed adjacent to said magnetic shielding means for producing magnetic field currents in said shielding means;

source means for providing an alternating, decaying current to said current conducting means, thereby to produce an alternating, decaying magnetic field in said shielding means, said source means including:

current generator means for providing an output current which decays exponentially with a predetermined time constant;

oscillator means for providing a square wave output signal at a predetermined low frequency;

polarity reversing switch means for coupling the output of said current generator means to said current conducting means, said switch means having control input means coupled to the output of said oscillator means for reversing the polarity of the exponentially-decaying current output from said current generator in synchronism with said square wave signal.

* * * * *